Reissued Jan. 14, 1941

Re. 21,690

UNITED STATES PATENT OFFICE 21,690

PREPARATION OF CONTACT MASSES FROM GELS AND THE LIKE AND PRODUCT THEREOF

George R. Bond, Jr., Paulsboro, N. J., assignor to Houdry Process Corporation, Dover, Del., a corporation of Delaware No Drawing. Original No. 2,146,718, dated February 14, 1939, Serial No. 83,309, June 3, 1936. Application for reissue May 23, 1939, Serial No. 275,253

24 Claims. (Cl. 252—270)

The present invention relates to contact masses which may promote, enter into, or in any way assist chemical reactions, or which are valuable by reason of their absorptive and/or adsorptive properties. It is particularly concerned with contact masses which originate wholly or in part from sols, gels or gel-like materials.

Gel-like materials include a wide range of substances of simple or complex nature, including chemical compounds and mixtures of compounds. One widely known material of the gel type is silica gel. This substance, either alone or in conjunction with other materials, has been used or proposed for use as a contact mass in many chemical and physical processes, including decolorization and/or clarification of liquids, separation of gases by adsorption, storage of flammable fluids, absorptive processes for refrigeration, the purification of gases and liquids, as well as in catalytic processes, including syntheses and decompositions in both the organic and inorganic chemical fields. Other known gels or gel-like materials having properties which make them suitable for use as contact masses include: other silicious materials, such for example, as simple silicates of many metals as of aluminum, iron, zinc, copper, vanadium, magnesium, calcium, tungsten, nickel, manganese, cobalt, cerium; poly-silicates of alumina and other metals, some of which have base exchanging or zeolitic properties; salts containing negative metallic radicals and which can precipitate in gel form, as exemplified by certain aluminates, vanadates, tungstates, stannates and titanates; hydroxides which can be obtained as gels such as the hydroxides of iron, aluminum, chromium, copper, cobalt, nickel, etc.; certain acids such as tungstic, stannic and titanic acids; and mixtures or compounds of the above classes of substances.

Heretofore it has been the practice to prepare contact material in usable form directly from masses of gel after the latter have been precipitated and set. The usual procedure has been to heat such masses in order to effect substantially complete dehydration of the gel and to reduce it to solid form. The solidified mass was then crushed or broken in any desired manner to produce fragmentary pieces which were screened to reject the fines and to select fragments of a size within a desired or acceptable range of sizes. Oversized fragments were further broken and the screening process repeated.

The drying or hardening operation caused considerable shrinkage or volume reduction of the gel, often to the extent of 60 to 75% or more of the original volume of the mass or filter cake. The dried cake and subsequently produced fragmentary pieces were dense and extremely friable. Because of this friability, large quantities of fines were made during the crushing operation. Furthermore, this property tends to impose practical limits upon the size of fragments having sufficient mechanical strength to withstand the stresses encountered in ordinary use, and, in many instances, it was necessary to use beds of extremely small granules or fragments of the contact mass, despite the high resistance which such beds offered to the flow of fluids through them. Many of the contact masses prepared from dried gels, in the manner indicated above, were subject to disintegration when immersed in certain liquids and even when wetted, whether accidentally or otherwise. This was particularly true of certain silicious gels. Silica gel, for example, disintegrated with almost explosive violence when immersed in water. Other gels were so weakened by wetting that they were rendered unfit for use as contact masses. Consequently, much care and expense were incurred in the packing and shipment of such materials. In the case of zeolitic water softening agents, it was necessary to prepare and ship them in a moist or wet state, the water content being usually of the order of 30% by weight, in order that they might maintain the proper size and shape during shipment and/or use. Heat curing treatment of such materials tended to decrease but did not always correct this lack of mechanical stability.

In contact operations it is preferable to present the contact material in pieces of uniform size and shape. This can best be effected by a molding operation. However, previous attempts to mold wet gel directly have often resulted in complete failure, and when the molding operation was at all possible the molded pieces were no better in quality than, and often inferior to, fragmentary pieces produced by the above described method of forming a solid cake and then crushing it.

The fines made luring the crushing operation, usually amounting to 10 to 15% and sometimes as much as 30% of the original gel, were unavoidable and often represented loss of valuable material. Hence, it has been proposed to utilize such fines in the preparation of contact masses despite the fact that, in many instances, masses containing fines were known to be inferior in quality. One proposal was to rework such fines in a new batch of the gel. This method of reclaiming fines tended to produce contact masses which were grainy and weak. It was also proposed to prepare molded pieces of the fines by pressing them into briquettes or pellets. Again a physically unstable contact mass was formed. Still another proposal was to mix the fines with an extraneous binding agent and to mold the mixture. The binder diluted or modified the contact mass, and, in numerous instances, the resulting pieces were decidedly inferior in quality. It has been proposed also to use a binder which could be converted into an active form by treatment of the molded pieces. For example, sodium silicate was proposed as a binding material for silica gel. The molded pieces were to be treated by acid so as to convert the sodium silicate into silica gel. This conversion in many instances was incomplete or required excessive lengths of time and amounts of acid. Furthermore, the treatment was apt to be detrimental to the physical and/or chemical structure of the contact mass. In every case processes designed for reclamation of fines involved a second handling and reprocessing of a substantial proportion of the dried gel. In many instances, expensive equipment and/or additional material including chemical reagents were required.

One object of the present invention is to provide a simple and efficient method of preparing contact masses from sols, gels or gel-like materials. Another object is to produce from the above materials contact masses in any desired size and shape and in stable form. Another object is to transform such materials into molded pieces of improved porosity and having increased amounts of readily available contact surface. Another object is to produce such masses without the use of extraneous binding materials. Still another object is to avoid the production of fines or waste material of depreciated value. Still other objects will be apparent from the detailed discussion which follows.

The invention involves a method for producing from a gel a heterogeneous plastic mass which will not shrink to any substantial extent when dried, and which hardens into a coherent body having high mechanical stability. This plastic mass is stiff, but readily workable, and resembles in many respects batches of potters' and brickmakers' molding mixtures. It is peculiarly adapted to forming or molding operations including extrusion, pelletting, etc. According to one aspect of the invention, the essential steps for the preparation of the unshrinkable plastic mass are as follows:

(*a*) A gel of the desired composition is prepared and may then be washed in known manner, with or without removal of excess liquid;

(*b*) The gel is divided into two portions;

(*c*) One portion, usually the predominant proportion of the original gel, is dehydrated to effect hardening and substantially complete shrinkage thereof and is then reduced to finely divided or comminuted and preferably washed form;

(*d*) The dried and comminuted portion is then blended with gelatinous material remaining from step (*b*) to produce a plastic mass of the proper consistency.

Prior to or during the subsequent forming operation the plastic mass is preferably subjected to substantial pressure in order to effect compacting of the preshrunk particles and even distribution of a thin layer of the wet part of the gel between and around these particles. Usually, sufficient pressure is exerted on the mass when it is forced through an extrusion die or when it is compacted or compressed in the preparation of pellets. In such operations, pressures ranging from 800 to 3000 pounds per square inch are often reached. If the operation itself does not involve application of substantial pressure to the plastic mass, suitable pressure, as, for example, a pressure in the above mentioned range, can be imposed upon it before it is formed.

The wet part of the gel serves as a lubricant and wetting agent for the dried or preshrunk material during the forming operation, and, upon drying of the formed pieces, firmly cements or binds together the dehydrated or preshrunk particles. Although the wet portion of the mixture is often a substantial proportion of the original gel, the extensive amount of shrinkage of this portion which takes place during the subsequent drying step does not cause substantial volume reduction of the compacted and formed mass, but occurs wholly within the mass to provide a heterogeneous, very porous and comparatively light structure of amorphous material in which enormous areas of adsorptive or contact surfaces are readily available to fluids. The dried molded pieces are further characterized by having high physical or mechanical stability, as evidenced by high crushing, tensile and shearing strengths and by resistance to disintegration when wet by or immersed in liquids.

The most suitable ratio of preshrunk particles to undried material in the plastic mixture varies with the characteristics of the gel and can easily be determined for each gel by simple experiments. Usually the best plastic mixtures are obtained by utilizing dried gel considerably in excess of wet gel, good results being obtained when the ratio of gel which is preshrunk to unmodified gel lies within or above the range of 1:1 to 5.7:1. When a complete batch of gel is utilized this range corresponds to effecting preshrinkage of 50% to 85% of the original material. For silicious materials good results may be obtained when the ratio lies above 1.5:1 as up to 4:1, or at least 60% to 80% of the gel is preshrunk when a given batch is completely used up.

Moderate temperatures are preferably employed in the preshrinking step. Temperatures which cause sintering of the starting material or removal of excessive amounts of any water of composition from the gel sometimes tend to impair the mechanical stability of the formed pieces. Good results are usually obtained when drying temperatures under 400° F. are used, such, for example, as 180° to 250° F. The strength of the finished pieces of contact mass is to some extent dependent upon the size of the finely divided preshrunk material, the tendency being toward greater strength with finer division. Suitable particle sizes are 60 mesh or finer, and preferably 100 mesh or finer, as up to 400 mesh.

Sometimes it is desired to provide a contact mass containing a plurality of gels. In such cases, the gels may be mixed prior to the preshrinking step, or all or a predetermined proportion of one or more of the gels may be preshrunk, the remaining material serving as the wet portion of the plastic mixture. It is sometimes desirable to include non-gel-like materials in a contact mass, as for example, finely divided metals or metallic compounds. Such material can be mixed with the original gel, but is preferably added to that portion of the gel which has been or is in the process of being preshrunk.

The step of combining the preshrunk and wet fractions of the gel can be effected in any type of apparatus capable of making a good mixture. If the mixture is to be extruded and if it is desired to decrease friction by the addition of a lubricant, care should be taken to select a material which will not impair the product and preferably one which will be removed during the subsequent drying operation, such for example as low boiling hydrocarbons or hydrocarbon mixtures, water, etc.

The molded pieces can be dried at any temperature that is consistent with maintenance of the physical and/or chemical stability of the gel-like substance or substances comprising the mass. In many instances, drying temperatures within the range specified for the preshrinking step produce pieces having satisfactory strength. Sometimes, however, in order to provide an exceptionally strong bond between the preshrunk and wet portion of the gel it is desirable to use somewhat higher temperatures as up to 600° F. or 700° F. or up to 1000° F. but below the temperature at which the physical or chemical structure of the mass is destroyed as through sintering or elimination of water of combination. When it is desirable to effect tempering or reduction of the catalytic or adsorptive properties of the contact mass, drying temperatures which cause change in the structure of the mass can be employed.

The following examples provide specific illustrations of the invention:

*Example 1*

An aluminum silicate gel was made by the interaction between sodium silicate and ammonium aluminum sulphate. The precipitate was washed and excess water removed as well as possible in a vacuum filter. Approximately 75% of the resulting filter cake was substantially completely dried in a current of air for about 6 hours at about 220° F. and the dried material ground to about 150 mesh. The dried and ground gel was mixed with the remaining portion of the wet gel to form a plastic mass which was extruded and cut to produce cylindrical pieces of about 2 mm. diameter and 4 mm. in length. These were dried at about 220° F. The dried pieces were strong, porous and highly adsorptive. The individual pieces were capable of resisting concentrated loads as high as 600 grams applied through a knife edge perpendicular to the axis of the cylinder and were capable of absorbing and retaining 95 to 100% of their weight of water. When heated to 600° F. these cylinders resisted concentrated loads of about 900 grams under a knife edge and had about the same absorptive capacity. Even after heating to 600° F., the pieces had substantially the same diameter as when freshly extruded.

*Example 2*

In order to determine in detail the advantages of the present invention over the former conventional methods of preparing contact masses from gels, a batch of silica gel, which was precipitated and washed in conventional manner, was subjected to different treatments.

First, a fragmented contact mass was prepared in conventional manner.

A portion of the batch was dried at temperatures in the range of 180° to 220° F., during which step the gel shrunk to about 40% of its original volume. The dried material was crushed to produce fragments which were screened to segregate pieces having a size of 4 to 8 mesh. These pieces were then heated to about 700° F. and were examined. The individual fragments were dense and possessed definite cleavage planes. The strengths of these fragments were not uniform, some of them splitting under concentrated loads as low as 50 grams. When immersed in water they rapidly disintegrated to small grains, none of which was larger than about 16 mesh. The disintegrated fragments were capable of absorbing about 65% of water by weight.

Second, and in sharp distinction to the above, the remainder of the batch was utilized to prepare improved contact masses according to the present invention.

A plastic mixture was prepared from this remainder by drying and grinding approximately 80% of it, substantially as described in Example 1, and then mixing the dried and ground part with the remaining portion of wet gel.

A portion of this mixture was extruded under a pressure of the order of 1500 pounds per square inch and cut into pellets having a diameter of about 4 mm. and a length of approximately 4 mm. These pellets were dried at temperatures which were slowly increased to about 600° F. During this operation practically no shrinkage of the pellets occurred. The dried pellets uniformly resisted concentrated loads of about 400 grams. They did not disintegrate even when immersed in boiling water and were capable of absorbing more than 100% of water by weight.

The remaining portion of the plastic mixture was not molded but was compressed under a pressure of about 1500 pounds per square inch and was then dried at temperatures which were slowly increased to about 600° F. in substantially the same manner as the first portion of the plastic mass. Practically no shrinkage of the mass took place during the drying step. The dried mass was broken into fragments, all of which were resistant to disintegration upon immersion in boiling water, even when they were large enough to be retained on a 2 mesh screen. They could absorb about 100% of water by weight. The fragmented pieces were then screened to segregate pieces having a size of 4 to 8 mesh. These pieces were uniformly about three times as strong as fragments of the same size prepared in the conventional manner by drying the wet gel directly and fragmenting the dried mass.

*Example 3*

A nickel silicate gel was prepared by reacting sodium silicate and nickel ammonium sulphate. The precipitated gel was made into a plastic mixture substantially after the manner described in Example 1, approximately 75% of the original gel being dried at moderate temperature and ground to 150 mesh and finer and then combined with the remaining 25% of the gel. This mixture was then extruded to produce pastilles of about 2 mm. diameter and 4 mm. in length. The pastilles were gradually heated to about 600° F. to effect drying thereof and when dried were substantially the same size as when extruded, were capable of resisting 500 grams concentrated load, and could absorb about 80% by weight of water.

*Example 4*

A blend of magnesium and aluminum silicates was made by reacting aluminum alum and magnesium sulphate with water-glass. Approximately 75% of the resulting gel was dried and ground substantially as described in Example 1 and mixed with the remaining portion of the wet gel to produce a plastic mixture. From this mixture molded pellets were produced by extrusion through a die providing 2 mm. openings. The pellets were dried at temperatures within the range of 400 to 600° F. Again no appreciable shrinkage of the pellets took place. They were capable of resisting concentrated loads of approximately 950 grams and could absorb about 85% water by weight.

*Example 5*

A zeolitic polysilicate capable of use as a water treating agent was prepared by the reaction between sodium aluminate and sodium silicate. Approximately 75% of the resulting sodium aluminum silicate gel was preshrunk and ground to 100 mesh and then combined with the remaining wet portion of the gel substantially as described in Example 1. The resulting plastic mixture was molded into pellets. After drying at temperatures in the range of 180 to 220° F., the pellets resisted concentrated loads of about 1000 grams and could absorb approximately 75% water by weight. When immersed in boiling water they did not disintegrate, nor did fragmented pieces prepared by drying and breaking an unextruded portion of the plastic mixture. Both the extruded and fragmented forms were capable of shipment in a substantially bone dry state.

From the very large number of gels which have been processed according to the present invention venadyl aluminate and stannic acid may be selected as representative of materials at or near the extremities of the range of ratios of the part to be preshrunk and comminuted to the part retained in wet form. Strong, highly adsorptive molded pieces are produced from vanadyl aluminate when at least 50% of the original gel is dried and ground. In the case of stannic acid a good plastic non-shrinkable mixture is made when approximately 85% or more of the gel is preshrunk.

It is apparent from the above that the present invention provides a solution to many problems that have existed heretofore in the production and use of contact masses which contain gels or gel-like materials. It has made practicable the manufacture from such materials of contact masses having higher physical stability and adsorptive and/or absorptive capacity. These masses can be made in pieces having any desirable size and shape without the utilization of extraneous binding agents or chemical reagents, without expending the time, expense and care involved in using such substances, and without rerunning or reprocessing substantial proportions of the original gel. The process for making the improved contact masses is extremely simple in character and is efficient and economical.

When the term "knife edge" is used herein and in the appended claims it refers to the edges of knives of the type commonly used to provide bearing surfaces or fulcrums in analytical and other pressure balances or scales.

I claim as my invention:

1. In the process of converting gels into compact, porous, mechanically stable pieces suitable for use in contact operations, the steps which comprise drying a portion of the gel to effect substantially complete shrinkage thereof, then mixing said portion in comminuted form with another and wet part of said gel, and proportioning said portion and said part so that the resulting mixture is stiff, workable and does not shrink to substantial extent when dried.

2. In treating gels or gel-like material to produce therefrom molded contact masses of substantially uniform size and shape and of high physical stability, the process steps of drying a portion of the wet gel until substantially complete shrinkage of the same is effected, reducing the resulting shrunken portion to finely divided form, mixing said portion with another and wet portion of said gel, regulating the proportion of shrunken and finely divided gel to wet gel so that the resulting mixture is a plastic mass which does not shrink to substantial extent upon drying, and molding said mixture under substantial pressure.

3. In the production of contact masses from gels, the steps of preparing from wet gel a plastic mass which is stiff, workable, and which does not shrink to substantial extent upon drying comprising effecting substantially complete shrinkage of a portion only but at least 60% of the wet gel by drying the latter, reducing the shrunken gel to finely divided form, and mixing the fine, shrunken material with the remaining wet portion of the gel.

4. In the production of physically stable, highly adsorptive contact masses from gels, the process of producing a substantially unshrinkable plastic mixture therefrom comprising providing two unequal portions of wet gel or gel-like material, the amount of one of said portions being at least three times the amount of the other, drying the larger of said portions to effect substantially complete shrinkage of the same and mixing the dried portion in finely divided form with the other and wet portion.

5. In the production from gels of physically stable contact masses, involving the formation of uniform pieces of said mass from a substantially unshrinkable plastic mixture, the steps comprising providing two unequal portions of wet gel or gel-like material, the amount of one of said portions being at least three times the amount of the other, drying the larger of said portions to effect substantially complete shrinkage of the same, mixing the two portions, and molding the resulting plastic mixture under substantial pressure.

6. In the preparation of molded contact masses from silicious gels, the process of drying a portion only but at least 75% of the original gel at moderate temperatures until substantially complete shrinkage of that portion is effected, grinding the shrunken portion to reduce the same to a particle size of a 100 mesh or finer, mixing that portion with the remaining and wet portion of the gel to produce a plastic mixture, molding the latter into pieces of uniform size and shape, and drying the molded pieces at a temperature below that at which substantial change in the structure of the gel takes place.

7. In the production of highly adsorptive contact masses having high physical stability from silicious gels, the steps of producing a plastic mixture which does not shrink to substantial extent upon drying, comprising drying a portion only but at least 75% of the original and wet gel at a temperature not in excess of 400° F. to effect substantially complete shrinkage of the same, reducing the dried gel to finely divided form, mixing the dried and finely divided gel with the remaining and wet portion thereof, and subjecting the resulting mixture to substantial pressure.

8. In the production of molded contact masses from a prepared gel, the steps of dividing the wet gel into two portions in the ratio of at least 4:1, drying the larger of said portions until substantially complete shrinkage of the same is effected, reducing said dried portion to finely divided form, providing a plastic mass which is substantially unshrinkable upon drying by mixing said dried portion with the smaller and wet portion, and molding said plastic mass into pieces of desired size and shape under substantial pressure.

9. In the production of molded contact masses from a prepared gel the steps of dividing the wet gel into two portions in the ratio of at least 4:1, drying the larger of said portions at temperatures below 400° F. until substantially complete shrinkage thereof is effected, reducing the particle size of said dried portion to 60 mesh and/or finer, providing a plastic mass which does not shrink to substantial extent upon drying by mixing said portion with the smaller and wet portion, molding said plastic mass into pieces of desired size and shape under substantial pressure, and drying said pieces.

10. In the preparation of highly adsorptive and physically stable pieces of suitable sized and shaped contact masses from gels or gel-like materials, the steps of providing two unequal portions of wet gel, the amount of one of said portions being at least one and one half times the amount of the other, drying the larger of said portions to effect substantially complete shrinkage thereof, reducing the dried portion to finely divided condition, mixing the dried and finely divided portion with the remaining and wet portion to produce a plastic mixture which is substantially unshrinkable upon drying, adding a dry, finely divided material to the gel to adjust the plasticity of the mixture, producing from the latter particles of suitable size, and drying said particles.

11. In the preparation of molded contact masses from gels, the steps of providing two portions of wet silicious gel, the amount of one of said portions being at least three times that of the other, drying the larger of said portions to effect substantially complete shrinkage thereof, reducing the shrunken portion to finely divided condition, adding a suitable amount of dry, finely divided catalytic material to the shrunken portion, mixing the resulting mixture with the remaining and wet portion to produce a stiff and workable plastic mixture which does not shrink to substantial extent upon drying, molding said mixture under substantial pressure, and drying the molded mixture.

12. In the production of physically stable, highly adsorptive contact masses from gels the process of producing a plastic mass which does not shrink to substantial extent upon drying and forming said mass into pieces of suitable size and shape comprising the steps of providing two unequal portions of wet gel or gel-like material, the amount of one of said portions being at least three times the amount of the other, drying the larger of said portions at a temperature in the range of 180° F. to 250° F. until substantially complete shrinkage of said portion is effected, reducing said larger and dried portion to a particle size of 100 mesh or finer, mixing the resulting finely divided material with the remaining and wet portion of gel, washing at least a part of the gel or gel-like material prior to said mixing step, molding the resulting plastic mixture under a pressure of at least 800 pounds per square inch into pieces of suitable size and shape, and drying the molded pieces at a temperature below that at which substantial change in the structure thereof taken place.

13. An adsorptive preformed unit valuable for use as catalyst or catalyst support consisting of a hard heterogeneous aggregate of finely divided prehardened particles of synthetic inorganic gel bonded together by a minor quantity of synthetic inorganic gel uniformly distributed among said particles, a cylindrical test piece of the aggregate having a diameter of about 2 mm. being strong enough to support concentrated load of at least 700 grams applied through a knife edge across its axis.

14. An adsorptive molded unit of predetermined size and shape suitable for use as catalyst or catalyst support consisting of 100 mesh or finer hardened synthetic inorganic gel particles bonded together in a dry, hard, tough, heterogeneous aggregate by a minor quantity of synthetic inorganic gel uniformly distributed throughout the aggregate and between said particles, said unit having adsorptive capacity for water of at least 75% water by weight and being resistant to disintegration upon immersion in or saturation with water, the resistance of said unit to mechanical stress being 700 to 1000 grams concentrated load applied through a knife edge across the axis of a cylindrical test piece thereof having a diameter of about two millimeters.

15. A rigid, tough, hard molded unit valuable for use as catalyst or catalyst support consisting of finely divided prehardened particles of synthetic silicious gel cemented together by a further but minor quantity of synthetic inorganic gel uniformly distributed among and between said particles to form a heterogeneous aggregate, a cylindrical test piece of which having a diameter of about 2 mm. will support a concentrated load of at least 900 grams applied through a knife edge across its axis.

16. A highly adsorptive molded unit valuable for use as catalyst or catalyst support consisting of plural oxide synthetic inorganic gel, said unit being composed of prehardened particles of synthetic gel of 60 mesh size or smaller bonded together in a porous, tough, hard heterogeneous aggregate by a further quantity of the same gel uniformly distributed among said particles by mixture therewith and limited to such minor amount that test pieces of the aggregate in the form of cylinders of about 2 mm. diameter will support at least 900 grams concentrated load applied through a knife edge across its axis.

17. A rigid heterogeneous preformed aggregate adapted for use as catalyst or catalyst support consisting of finely divided prehardened particles of synthetic silica and alumina gel bonded together by a further and minor quantity of synthetic inorganic gel uniformly distributed between and around said particles and cementing the latter together in a hard, tough, porous body, a cylindrical test piece of which having a diameter of about 2 mm. will support at least 900 grams concentrated load applied through a knife edge across its axis.

18. An adsorptive unit valuable for use as catalyst or catalyst support comprising a preformed body of 2 to 4 mm. diameter consisting of finely divided particles of synthetic inorganic gel bonded together in a heterogeneous dry, hard aggregate by a further but minor quantity of synthetic inorganic gel which had been mixed in the wet state with said particles, said body having such high resistance to mechanical stress that a cylindrical test piece of the dry, hard aggregate having a diameter of about 2 mm. will support at least 700 grams concentrated load applied through a knife edge across its axis.

19. A molded, rigid heterogeneous aggregate suitable for use as catalyst or catalyst support consisting of finely divided particles of a plural oxide silicious gel bonded together by a further quantity of silicious gel, which had been uniformly distributed in wet state between and around said particles and subsequently hardened, the gel in wet state being limited to such minor amount that the hardened aggregate is resistant to disintegration upon immersion in or saturation with water and has such resistance to mechanical stress that a cylindrical specimen of the aggregate having a diameter of about 2 mm. will support at least 900 grams concentrated load applied through a knife edge across its axis.

20. A tough, rigid molded contact unit valuable for use as catalyst or catalyst support consisting of synthetic inorganic gel, said unit being a heterogeneous aggregate of prehardened finely divided particles of said gel of 100 mesh or finer bonded together by a further but minor quantity of said gel which had been uniformly mixed in wet state with said prehardened particles and the resulting aggregate subsequently hardened, a cylindrical specimen of the aggregate having a diameter of about 2 mm. being strong enough to support at least 700 grams concentrated load applied through a knife edge across its axis.

21. In preparing molded contact masses valuable for use as catalyst or catalyst support and consisting of synthetic inorganic gel, the process of reducing a prehardened and preshrunk synthetic inorganic gel to finely divided condition, incorporating with the finely divided gel a lubricating and binding material containing synthetic inorganic gelatinous substance as the sole binding agent, proportioning said gel and said material so that the resulting heterogeneous mixture contains only a minor quantity of said substance and is stiff and workable but will not shrink to substantial extent upon drying, molding said mixture into pieces of predetermined size and shape, and heating the molded pieces to dry them and to yield a product, cylindrical test pieces of which of about 2 mm. diameter will support concentrated loads of at least 700 grams applied through a knife edge perpendicular to their axes.

22. The process of making molded contact masses valuable for use as catalyst or catalyst support consisting of inorganic synthetic gel comprising the steps of reducing hardened and preshrunk synthetic silicious gel to particles of 100 mesh size or finer, mixing said particles and a lubricating and bonding material containing synthetic inorganic gelatinous substance as the sole binding agent, proportioning said particles and said material so that the resulting heterogeneous mixture contains only a minor quantity of said substance and is stiff and workable but will not shrink to substantial extent upon drying, molding said mixture under pressure into pieces of predetermined size and shape, and heating said pieces to dry and harden the same into rigid form having high mechanical strength, a test piece of which in the form of a cylinder having a diameter of about 2 mm. will support concentrated loads of at least 500 grams applied through a knife edge across the axis of said cylinder.

23. A contact mass valuable for use as catalyst or catalyst support consisting wholly of the same precipitated inorganic gel and comprising a dry, hard molded unit having high adsorptive capacity for water and being resistant to disintegration upon immersion in or saturation with water, said unit having a porous heterogeneous structure of strongly bonded discrete particles of dried gel of a fineness of at least 100 mesh and having such strength that a cylindrical test specimen of about 2 mm. diameter will support at least 700 grams concentrated load applied across its axis, said unit being identical with the product produced by reducing said gel to prehardened and preshrunk finely divided condition, incorporating with the finely divided gel a lubricating and binding material containing synthetic inorganic gelatinous substance as the sole binding agent, proportioning said gel and said material so that the resulting heterogeneous mixture contains only a minor quantity of said substance and is stiff and workable but will not shrink to substantial extent upon drying, molding the mixture into pieces of predetermined size and shape, and heating the molded pieces to dry and harden them.

24. A contact mass valuable for use as a catalyst or catalyst support consisting wholly of the same precipitated silica-alumina gel and comprising a dry, hard molded unit having high adsorptive capacity for water and being resistant to disintegration upon immersion in or saturation with water, said unit having a porous heterogeneous structure of strongly bonded discrete particles of dried gel of a fineness of at least 100 mesh and having such strength that a cylindrical test specimen of about 2 mm. diameter will support at least 700 grams concentrated load applied across its axis, said unit being identical with the product produced by reducing said gel to prehardened and preshrunk finely divided condition, incorporating with the finely divided gel a lubricating and binding material containing synthetic inorganic gelatinous substance as the sole binding agent, proportioning said gel and said material so that the resulting heterogeneous mixture contains only a minor quantity of said substance and is stiff and workable but will not shrink to substantial extent upon drying, molding the mixture into pieces of predetermined size and shape, and heating the molded pieces to dry and harden them.

GEORGE R. BOND, JR.